US012695824B2

(12) United States Patent
Xue et al.

(10) Patent No.: US 12,695,824 B2
(45) Date of Patent: Jul. 28, 2026

(54) SOUND OUTPUT SYSTEMS IN A TERMINAL DEVICE

(71) Applicant: Honor Device Co., Ltd., Shenzhen (CN)

(72) Inventors: Kangle Xue, Shenzhen (CN); Jiaze Huang, Shenzhen (CN); Kaiqiang Wang, Shenzhen (CN); Long Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 820 days.

(21) Appl. No.: 17/791,559

(22) PCT Filed: Feb. 10, 2022

(86) PCT No.: PCT/CN2022/075898
§ 371 (c)(1),
(2) Date: Jul. 8, 2022

(87) PCT Pub. No.: WO2022/193878
PCT Pub. Date: Sep. 22, 2022

(65) Prior Publication Data
US 2024/0305706 A1 Sep. 12, 2024

(30) Foreign Application Priority Data
Mar. 17, 2021 (CN) .......................... 202110287890.9

(51) Int. Cl.
*H04M 1/03* (2006.01)
*H04M 1/02* (2006.01)

(52) U.S. Cl.
CPC ......... *H04M 1/035* (2013.01); *H04M 1/0264* (2013.01); *H04M 1/0266* (2013.01)

(58) Field of Classification Search
CPC .. H04M 1/035; H04M 1/0264; H04M 1/0266; H04M 1/026; H04M 1/03
(Continued)

(56) References Cited

U.S. PATENT DOCUMENTS 11,528,543 B2 12/2022 Yin et al.
2016/0191097 A1* 6/2016 Huh ........................ H04R 1/025
455/575.1
(Continued)

FOREIGN PATENT DOCUMENTS

CN 207853947 U 9/2018
CN 208434100 U 1/2019
(Continued)

*Primary Examiner* — Michael Y Mapa
(74) *Attorney, Agent, or Firm* — WOMBLE BOND DICKINSON (US) LLP

(57) ABSTRACT

A terminal device includes a sound output device and a middle frame with a first through hole and a second through hole. The display module is mounted on the middle frame, and the sound output device is located on a side of the middle frame. The terminal device is provided with a first sound output hole set and a second sound output hole set. The sound output device is fixed to the middle frame by a bracket provided with a first groove section, a second groove section, and a third groove section. The sound output device is in communication with the first sound output hole set through the first groove section and the first through hole, and the sound output device in communication with the second sound output hole set through the first groove and the second through hole.

20 Claims, 13 Drawing Sheets

(58) Field of Classification Search
    USPC ............ 455/90.3, 128, 347, 350, 566, 575.1
    See application file for complete search history.

(56)                    References Cited

U.S. PATENT DOCUMENTS

| | | | |
|---|---|---|---|
| 2020/0252706 A1 | 8/2020 | Yin et al. | |
| 2020/0329293 A1* | 10/2020 | Park | H04M 1/026 |
| 2022/0046345 A1 | 2/2022 | Mai | |
| 2023/0053104 A1* | 2/2023 | Sun | H04R 1/403 |

FOREIGN PATENT DOCUMENTS

| | | | |
|---|---|---|---|
| CN | 208445625 U | 1/2019 | |
| CN | 109413246 A | 3/2019 | |
| CN | 111480330 A | 7/2020 | |
| CN | 110113453 B | 4/2021 | |
| EP | 2114084 A1 | 11/2009 | |
| WO | 2019062997 A1 | 4/2019 | |

* cited by examiner

SOUND OUTPUT SYSTEMS IN A TERMINAL DEVICE

CROSS-REFERENCE TO RELATED APPLICATIONS

This application is a National Stage of International Application No. PCT/CN2022/075898, filed on Feb. 10, 2022, which claims priority to Chinese Patent Application No. 202110287890.9, filed on Mar. 17, 2021. The disclosures of which are incorporated herein by reference in their entireties.

TECHNICAL FIELD

Embodiments of this application relate to the field of communications technologies, and in particular, to a terminal device.

BACKGROUND

With the development of continuously varied functions of electronic devices such as mobile phones, a variety of components for implementing different functions are integrated in mobile phones.

An existing terminal device may be shown in FIG. 2*a* and FIG. 3. A plurality of components such as a front camera module 6 are provided in a top region of the terminal device. The front camera module 6 is located right in the middle of a screen. Sound output holes 103 are also symmetrical with respect to a center line of the screen. Therefore, in an internal space of a terminal, the eccentric design of a sound output device 101 causes unbalanced sound output from two sides of the sound output holes 103. The sound output effect of a sound output hole 103 on a side close to the sound output device 101 is better than that of a sound output hole 103 on a side away from the sound output device 101.

However, when a user uses the terminal device, postures of answering a phone call includes holding a mobile terminal on a left ear side with a left hand and holding the mobile terminal on a right ear side with a right hand. In both postures, an ear blocks a partial region of the sound output holes, and the sound output device 101 can only emit sound from an unblocked region of the sound output holes 103. When the user blocks the sound output holes on the side with the better sound output effect, sound becomes inadequate, and user experience is affected.

SUMMARY

Embodiments of this application provide a terminal device, which resolves the problem of an inadequate sound effect of the terminal device.

To achieve the foregoing objective, this application adopts the following technical solutions: This application provides a terminal device, including a display module, a sound output device, and a middle frame. The display module is mounted on the middle frame, and the sound output device is located on a side of the middle frame away from the display module. The terminal device is further provided with a first sound output hole set and a second sound output hole set, and the first sound output hole set and the second sound output hole set are provided between a top of the terminal device and the sound output device. The first sound output hole set is located on a first side of a center of the top of the terminal device, the sound output device is located on a first side of the terminal device, the sound output device is opposite to the first sound output hole set, and the second sound output hole set is located on a second side of the center of the top of the terminal device. The sound output device is fixed to the middle frame by a bracket, and the middle frame is provided with a first through hole and a second through hole. The bracket is provided with a first groove, the first groove is close to the middle frame, and the first groove includes a first groove section, a second groove section, and a third groove section. The first groove section and the first through hole are opposite to the first sound output hole set, and the sound output device is in communication with the first sound output hole set through the first groove section and the first through hole. The second groove section and the second through hole are opposite to the second sound output hole set, and the third groove section is located between the first groove section and the second groove section. The sound output device is in communication with the second sound output hole set through the first groove and the second through hole. In this way, the sound output device is in communication with the second sound output hole set through the first groove and the second through hole, so that the sound output device can effectively transmit sound to the second sound output hole set far away from the sound output device through the first groove and the second through hole, to make sound emitted from sound output hole sets at different positions more balanced and avoid inadequate sound output caused by blocking a sound output hole on one side when a user answers a phone call, thereby improving user experience.

In an optional implementation, the terminal device further includes a front camera module, the front camera module is located at a middle position of a top of a screen, the first groove is located between the front camera module and the top of the terminal device, the first through hole and the second through hole are located between the front camera module and the top of the terminal device, and the third groove section is opposite to the front camera module. In this way, the first groove is provided between the front camera module and the top of the terminal device, and can be used as a bridge to bypass a bottleneck position between a camera module and a sound output hole set, thereby improving the effect of sound emitted from the sound output hole set. In addition, compared with providing the first groove at another position, a distance from the second sound output hole set is shorter, so that sound can be better guided to the second sound output hole set.

In an optional implementation, in the middle frame, the first through hole is not in communication with the second through hole. In this way, the effect of sound emitted from the second sound output hole set can be improved.

In an optional implementation, the middle frame is provided with a second groove, the second groove provides communication between the first through hole and the second through hole, and the second groove is opposite to the front camera module. In this way, the second groove is provided to add a sound channel, so that the sound output device can be in communication with the second sound output hole set through the first groove section, the first through hole, and the second groove, thereby further improving the effect of sound emitted from the second sound output hole set.

In an optional implementation, the middle frame is provided with a third through hole, and the third through hole provides communication between the second groove and the third groove section. In this way, the second groove is in communication with the third groove section directly through an inclined hole, so that the size of a sound cavity channel becomes larger, thereby further improving the effect of sound emitted from the second sound output hole set.

In an optional implementation, the second groove is not in communication with the third groove section in a vertical direction. In this way, there is no need to open an inclined hole in the middle frame, and the sound cavity channel has a better sealing effect, so that sound can be better guided to the second sound output hole set.

In an optional implementation, the electronic device further includes a third sound output hole set, where the third sound output hole set is opposite to the second groove, the third sound output hole set is located between the first sound output hole set and the second sound output hole set, and the third sound output hole set is in communication with the second groove. In this way, when the second groove is in communication with the sound output device, sound emitted from the sound output device may be further guided to the third sound output hole set through the second groove, so that a sound output channel is added, and the sound effect of the sound output hole set is improved.

In an optional implementation, each of the first sound output hole set, the second sound output hole set, and the third sound output hole set includes one or more sound output holes, and the sound output hole is round, square, or the like. In this way, the shape of the sound output hole is more flexible.

In an optional implementation, the first sound output hole set, the second sound output hole set, and the third sound output hole set form one sound output hole. In this way, the sound output hole has a simple structure.

In an optional implementation, the first sound output hole set, the second sound output hole set, and the third sound output hole set are provided in the middle frame. In this way, the position of the sound output hole set is more flexible.

In an optional implementation, a cover is arranged on a surface of the display module away from the middle frame, and the first sound output hole set, the second sound output hole set, and the third sound output hole set are provided in the cover. In this way, the position of the sound output hole set is more flexible.

In an optional implementation, a bracket is provided to replace the bracket in the first aspect described above, the bracket is provided with a first groove section, a second groove section, and a third through hole, and the third through hole provides communication between the first groove section and the second groove section. The first groove section and the first through hole are opposite to the first sound output hole set, and the sound output device is in communication with the first sound output hole set through the first groove section and the first through hole. The second groove section and the second through hole are opposite to the second sound output hole set. The sound output device is in communication with the second sound output hole set through the first groove section, the third through hole, the second groove section, and the second through hole. In this way, the sound output device is in communication with the second sound output hole set through the first groove section, the third through hole, the second groove section, and the second through hole in the bracket, so that the sound output device can transmit sound to the second sound output hole set far away from the sound output device, to make sound emitted from sound output hole sets at different positions more balanced and avoid inadequate sound output caused by blocking a sound output hole on one side when a user answers a phone call, thereby improving user experience.

4

DESCRIPTION OF EMBODIMENTS

To make the objectives, technical solutions, and advantages of this application clearer, the following further describes this application in detail with reference to the accompanying drawings.

The terms such as "first" and "second" mentioned below are merely used for descriptive purposes, and shall not be understood as an indication or implication of relative importance or implicit indication of the quantity of indicated technical features. Therefore, features defining "first", "second", and the like may explicitly or implicitly include one or more such features. In the description of this application, unless otherwise stated, "a plurality of" means two or more than two.

In addition, in this application, position terms such as "upper", "lower", and the like are defined relative to an illustrative position at which a component is placed in the accompanying drawings. It should be understood that these direction terms are relative concepts and are used for relative description and clarification, and may vary accordingly depending on a position change of a component placed in the accompanying drawings.

In this application, unless otherwise explicitly specified or defined, the term "connection" should be understood in a broad sense. For example, the connection may be a fixed connection, a detachable connection, or an integral connection: or the connection may be a direct connection, or an indirect connection through an intermediary.

The embodiments of this application provide a terminal device. The terminal device may be a product with a display interface, such as a tablet computer, a mobile phone, an e-reader, a remote control, a personal computer (personal computer, PC), a notebook computer, a personal digital assistant (personal digital assistant, PDA), an in-vehicle device, a web television, a wearable device, and a TV, and a smart display wearable product such as a smart watch, and a smart band. A specific form of the terminal device described above is not particularly limited in the embodiments of this application. For the convenience of description, the following embodiments are all described by using an example in which the terminal device is a mobile phone.

Figure 1:
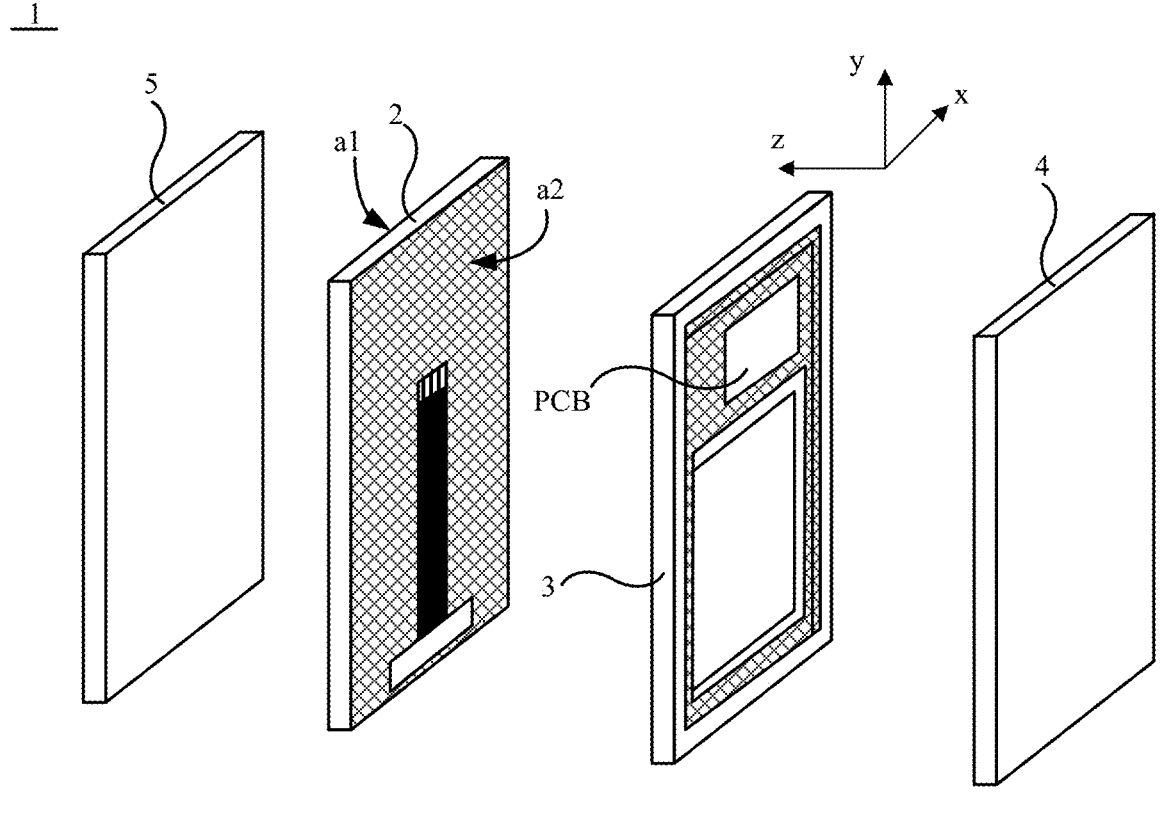
FIG. 1 is a schematic structural diagram of a disassembled terminal device.

As shown in FIG. 1, a terminal device 1 includes a display module 2, a middle frame 3, a housing (or referred to as a battery cover, or a rear housing) 4, and a cover 5.

The display module 2 includes a light-emitting surface a1 on which a display screen can be seen and a back surface a2 arranged opposite to the light-emitting surface a1. The back surface a2 of the display module 2 is close to the middle frame 3. The cover 5 is arranged on the light-emitting surface a1 of the display module 2.

In a possible embodiment of this application, the display module 2 is a liquid crystal display (liquid crystal display, LCD).

In another possible embodiment of this application, the display module 2 is an organic light-emitting diode (organic light-emitting diode, OLED) display module. Because an electroluminescent layer is arranged in each light-emitting sub-pixel in the OLED display module, the OLED display module can implement self-luminescence after receiving an operating voltage.

The cover 5 is located on a side of the display module 2 away from the middle frame 3. The cover 5 may be, for example, cover glass (cover glass, CG). The cover glass may have particular toughness.

The middle frame 3 is located between the display module 2 and the housing 4. A surface of the middle frame 3 away from the display module 2 is configured to mount internal elements such as a battery, a printed circuit board (printed circuit board, PCB), a camera (camera), an antenna. After the housing 4 covers the middle frame 3, the internal elements described above are located between the housing 4 and the middle frame 3.

The middle frame 3 includes, for example, a carrier board 301 and a frame 302 surrounding the carrier board 301. In some embodiments, the frame 302 may be a frame integrally formed on the carrier board 301.

For example, the cover 5 is arranged above the display module 2, and is connected to the frame 302 of the middle frame 3.

Referring to FIG. 1, electronic components such as a printed circuit board (printed circuit board, PCB), a camera, and a battery may be arranged on a surface of the carrier board 301 facing the housing 4. The camera and the battery are not shown in the figure. The housing 4 and the middle frame 3 are connected to each other to form an accommodating cavity used for accommodating the electronic components such as the PCB, the camera, the battery, and the like described above. Therefore, it is possible to prevent external water vapor and dust from entering the accommodating cavity, to affect the performance of the electronic components described above.

The display module 2 may be electrically connected to the PCB arranged on the carrier board 301 by a flexible printed circuit board (flexible printed circuit, FPC) to pass through the carrier board 301. Therefore, the PCB may transmit display data to the display module 2, so as to control the display module 2 to display images.

The display module 2, the middle frame 3, and the housing 4 may be arranged on different layers in a thickness direction of the electronic device. These layers may be parallel to each other. A plane in which each layer is located may be referred to as an X-Y plane, and a direction perpendicular to the X-Y plane may be referred to as the Z direction. That is, the display module 2, the middle frame 3, and the housing 4 may be distributed in layers in the Z direction. X, Y, and Z directions are shown in FIG. 1.

Figure 2A:
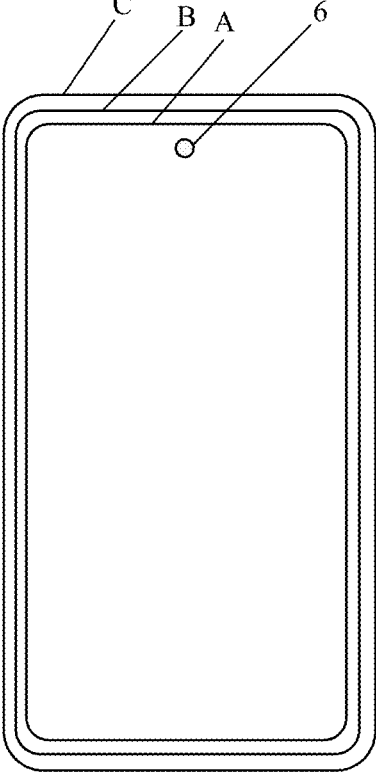
FIG. 2a is a schematic structural diagram of a terminal device.

Based on this, as shown in FIG. 2a, the terminal device 1 further includes a front camera module 6. The front camera module 6 is arranged on a side of the back surface a2 opposite to the light-emitting surface a1 of the display module 2. A light-receiving surface of the front camera module 6 faces the display module 2. The front camera module 6 may be electrically connected to the PCB.

The front camera module 6 is a component including a photosensitive sensor. The front camera module 6 may include, for example, one or more of a front camera, a fingerprint sensor, a proximity light sensor, a time of flight sensor (TOF), an iris recognition sensor, or a face recognition sensor. The front camera module 6 may be configured to capture a picture on a side where a display surface of the terminal device 1 is located.

The front camera module 6 is not limited in this embodiment, provided that the camera module located inside the terminal device can convert an optical image into electronic data by using an electronic sensor.

The camera module includes a lens. The lens is configured to input light to the front camera module 6, so that the front camera module 6 can convert the light into an imageable digital signal by using an imaging element. The lens can capture light outside the display module through a hollowed-out region in the display module 2, so that the camera module can shoot an image.

For an arrangement region of the front camera module 6, as shown in FIG. 2a, a display region boundary A is divided in the display module 2.

In a possible embodiment, the display module 2 further includes a cover boundary B located around the display region boundary A.

In another possible embodiment, a terminal device boundary C is arranged around the cover boundary B, and the middle frame 3 may be arranged between the terminal device boundary C and the cover boundary B.

A relative positional relationship between and the shapes of the display region boundary A and the cover boundary B are not limited. In the embodiments of this application, an example in which the cover boundary B surrounds the display region boundary A is used for description.

It can be understood that, the front camera module 6 included in the terminal device 1 implements specific functions by capturing light emitted to the front camera module 6 through the display module 2. The display module 2 transmits the light through a region defined by the display region boundary A. As shown in FIG. 2a, an orthographic projection of the front camera module 6 on the display module 2 is located in the region defined by the display region boundary A of the display module 2. Optionally, the orthographic projection of the front camera module 6 on the display module 2 may be located outside the region defined by the display region boundary A of the display module 2. For example, an arrangement manner of a water-drop screen or a notch screen is used.

Figure 2B:
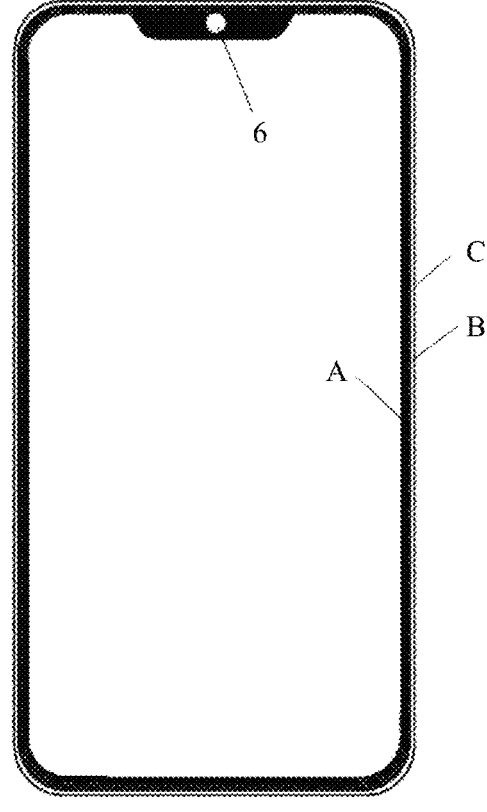
FIG. 2b is a schematic structural diagram of another terminal device.

For example, as shown in FIG. 2*b*, the terminal device uses a notch screen. The camera module is arranged in a notch region of the screen.

The arrangement manner of a sound cavity is described below by using a terminal device with a holed screen (FIG. 2*a*) as an example.

Figure 3:
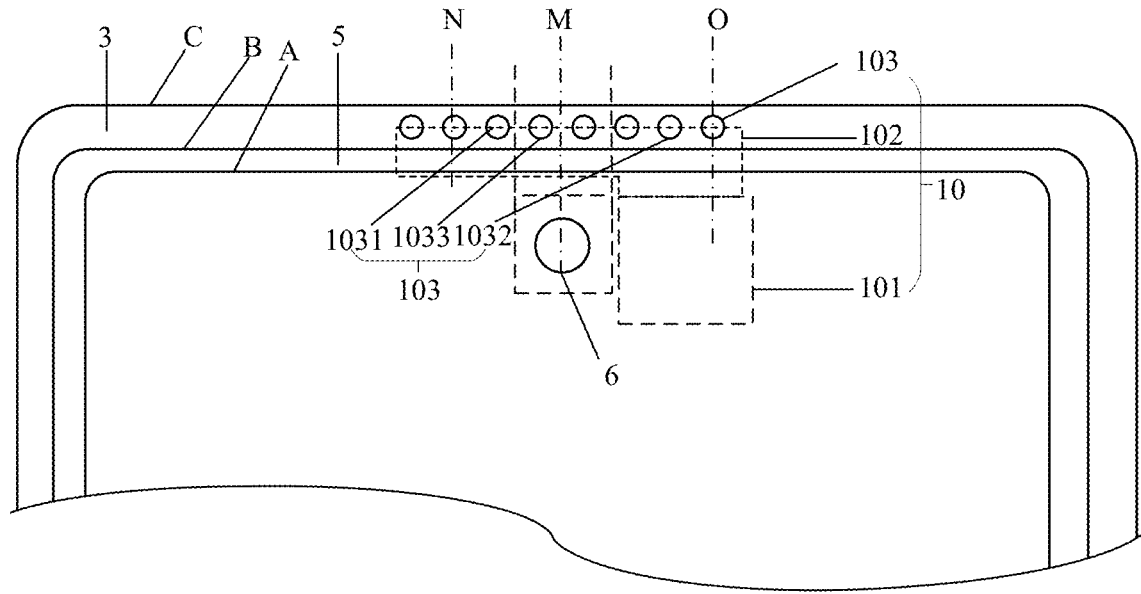
FIG. 3 is a schematic structural diagram of another terminal device.
Figure 4:
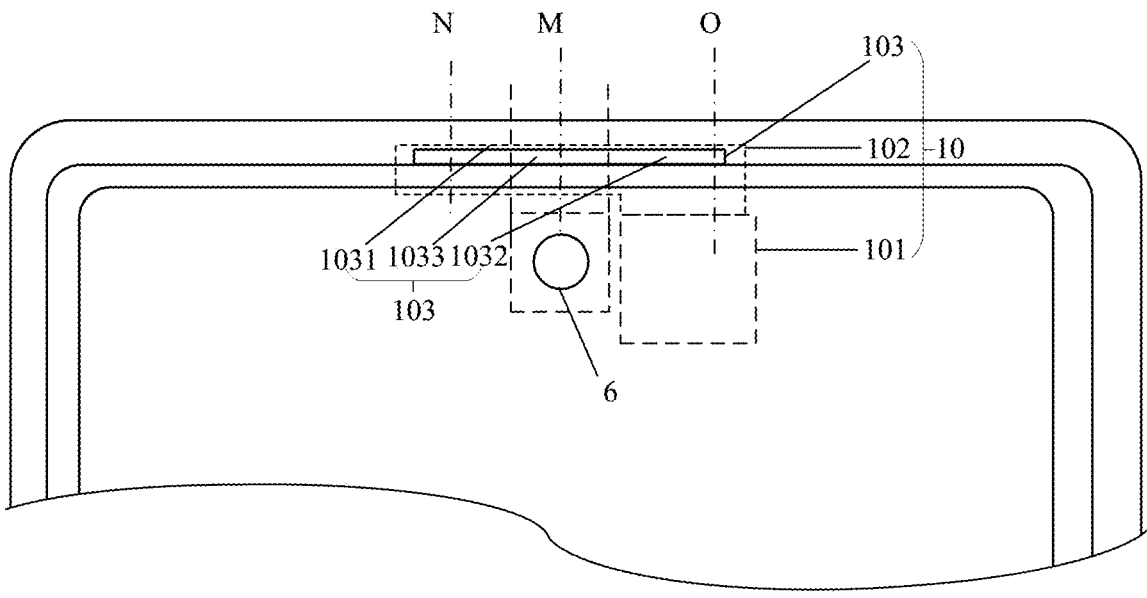
FIG. 4 is a schematic structural diagram of another terminal device.

As shown in FIG. 3 and FIG. 4, the terminal device further includes the sound output apparatus 10.

Figure 5:
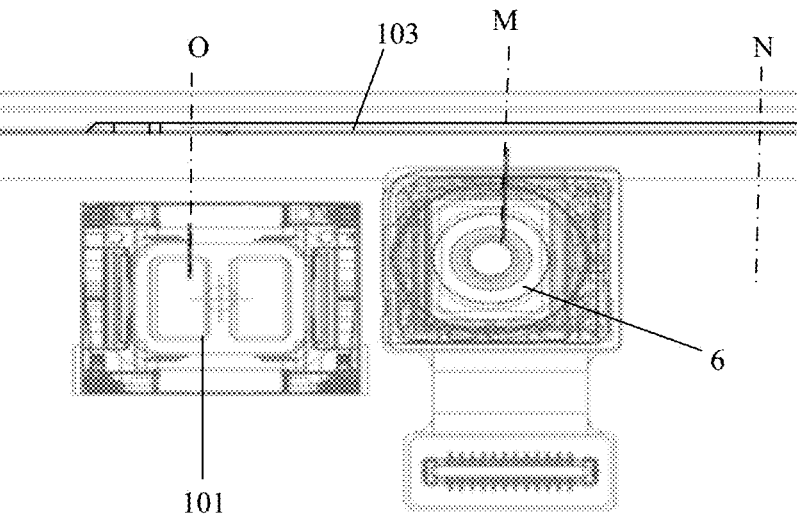
FIG. 5 is a perspective view of a terminal device.

The sound output apparatus 10 includes at least a sound output device 101, a sound cavity channel 102, and a sound output hole 103. In this embodiment, as shown in FIG. 5, the sound output device 101 may be an earpiece or a speaker.

The specific position of the sound output hole 103 is not limited in this embodiment of this application.

As shown in FIG. 3, the sound output hole 103 shown in this embodiment is provided in the middle frame 3 between the cover boundary B and the terminal device boundary C.

In some other embodiments, the sound output hole 103 may be provided in the cover 5 between the display region boundary A and the cover boundary B.

In other embodiments, a part of the sound output hole 103 may be provided in the middle frame 3 between the cover boundary B and the terminal device boundary C, and the other part is provided in the cover 5 between the display region boundary A and the cover boundary B.

These arrangement manners all fall within the protection scope of this application.

The specific shape of the sound output hole 103 is not limited in this embodiment. In some embodiments, as shown in FIG. 3, the sound output hole 103 adopts a plurality of round hole structures.

In some other embodiments, as shown in FIG. 4, there is one sound output hole 103, which may adopt a long strip structure.

In other embodiments, the sound output hole 103 may adopt an oval, a square, an irregular shape, or the like, which all fall within the protection scope of this application.

As shown in FIG. 3 and FIG. 4, two sides of the sound output hole 103 are symmetrical along a vertical center line of the terminal device (it can be understood that, the vertical center line is parallel to the Y direction, and in an actual product, the symmetry may have a particular range of error), so that the arrangement manner of the sound output hole 103 shown in this embodiment is adopted. Therefore, when a user uses the terminal device, the sound output hole 103 can be provided right facing the ear of the user, so that the effect of sound emitted from the sound output hole 103 can be improved, and the user can hear a more balanced sound effect through the evenly arranged sound output hole 103.

Further referring to FIG. 3 and FIG. 4, the sound output hole 101 includes, for example, a first sound output hole set 1031, a second sound output hole set 1032, and a third sound output hole set 1033. The first sound output hole set 1031, the second sound output hole set 1032, and the third sound output hole set 1033 may be different parts of one sound output hole, or each sound output hole set includes at least one sound output hole. The first sound output hole set 1031 is opposite to the sound output device 101. The third sound output hole set 1033 is opposite to the front camera module

6. The sound output device 101 is located on a side of the front camera module 6. The second sound output hole set 1032 is located in the other side of the front camera module 6 (a side away from the sound output device 101). The first sound output hole set 1031 and the second sound output hole set 1032 are symmetrical along a vertical center line of the front camera module 6. The vertical center line of the front camera module 6 and the vertical center line of the terminal device may be the same center line.

The sound cavity channel 102 is provided inside the middle frame 3, and is located below the Z direction of the display module 2. The sound cavity channel 102 is configured to connect the sound output hole 102 to the sound output device 101.

Specifically, the sound cavity channel 102 is configured to guide sound emitted from the sound output device 101 to the sound output hole 103, so that the sound output hole 103 can disperse sound emitted from the sound output device 101.

As shown in FIG. 5, the sound output device 101 is arranged on a left side of the front camera module 6.

Certainly, in other embodiments, the sound output device 101 may be arranged on a right side of the front camera module 6.

The front camera module 6 is usually arranged at a middle position of a top of the display module. To avoid the front camera module 6, the sound output device 101 needs to be arranged on the left or right side of the front camera module 6. To make sound emitted from the sound output hole 103 more balanced, the sound output hole 103 needs to be provided at a middle position of the electronic device. As shown in FIG. 3 and FIG. 4, the sound output device 101 is in communication with the sound output hole 103 through the sound cavity channel 102. The sound cavity channel 102 needs to avoid the front camera module 6.

In the foregoing embodiments, the sound cavity channel avoids the front camera module 6. In some other embodiments, the sound cavity channel may avoid other modules. For the arrangement manner of the sound cavity channel, reference may be made to the embodiments of this application, which all fall within the protection scope of this application.

Figure 6:
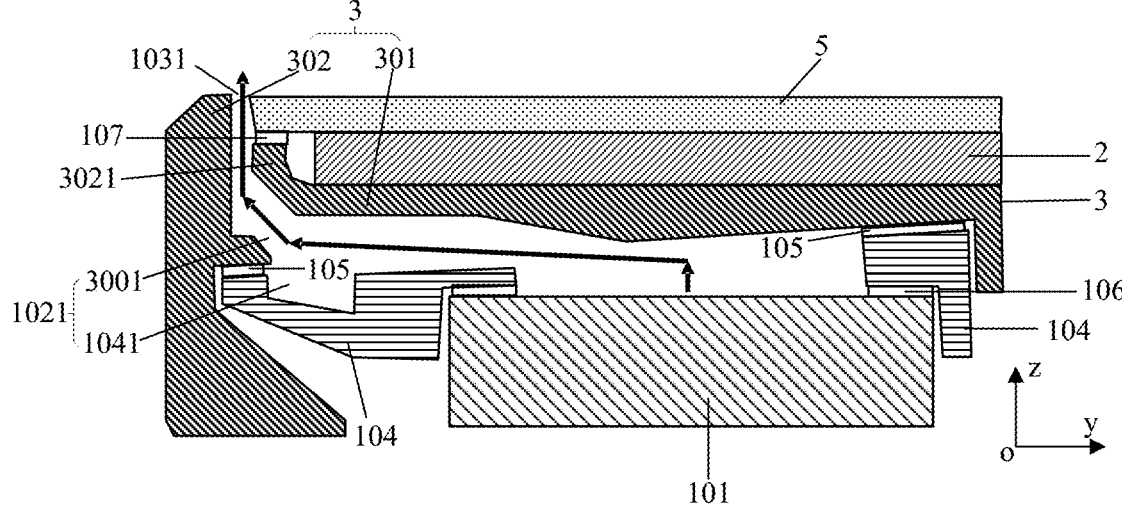
FIG. 6 is a diagram of a yoz cross section in FIG. 3, FIG. 4, and FIG. 5 at a position O.

The specific structure of the sound cavity channel is not limited in this embodiment of this application. FIG. 6 is a schematic diagram of a yoz cross section of the sound cavity channel at a position O in FIG. 3, FIG. 4, and FIG. 5 (the yoz cross section is perpendicular to the X-Y plane).

As shown in FIG. 6, a bracket 104 is arranged on a side of the middle frame 3 away from the display module 2. The sound output device 101 is mounted on the bracket 104.

An avoidance groove is provided at a position where the middle frame 3 is opposite to the sound output device 101. The bracket 104 is provided with a first groove section 1041. The middle frame 3 is provided with a first through hole 3001. The first groove section 1041 and the first through hole 3001 are opposite to the first sound output hole set 1031.

A first sound cavity 1021 includes the first groove section 1041, the first through hole 3001, and the avoidance groove. The first sound cavity 1021 is opposite to the sound output device 101.

The sound output device 101 is in communication with the first sound output hole set 1031 through the first groove section 1041 and the first through hole 3001.

The sound output device 101, the bracket 104, and the middle frame 3 jointly define the first sound cavity 1021.

The middle frame 3 includes, for example, a carrier board 301 and a frame 302 surrounding the carrier board 301. In some embodiments, the frame 302 may be a frame integrally formed on the carrier board 301. As shown in FIG. 6, a circle of step 3021 is arranged on an inner side wall of the frame 302. The step 3021 is configured to carry the cover 5. For example, the cover 5 is arranged above the display module 2, and is connected to the step 3021.

The cover 5, the step 3021, and the carrier board 301 define a cavity. The display module 2 is located in the cavity.

As shown in FIG. 6, the first sound cavity 1021 is in communication with the first sound output hole set 1031. As shown in FIG. 6, the frame 302 is provided with the first sound output hole set 1031. Optionally, the first sound output hole set 1031 may be opened in the cover 5.

To prevent that sound guided out from the sound output device 101 from leaking, as shown in FIG. 5, a first sealant layer 105 is arranged between the bracket 104 and the middle frame 3. A second sealant layer 106 is arranged between the sound output device 101 and the bracket 104.

Optionally, a third sealant layer 107 is arranged between the step 3021 and the cover 5. It should be noted that, in some other embodiments, the third sealant layer 107 may be partially removed, or the third sealant layer 107 may not be arranged, and the step 3021 only needs to be in contact with the cover 5.

This arrangement manner does not limit the specific materials of the first sealant layer 105, the second sealant layer 106, and the third sealant layer 107, provided that the first sealant layer 105, the second sealant layer 106, and the third sealant layer 107 have an adhesive function.

Specifically, the shape of the first sealant layer 105 between the bracket 104 and the middle frame 3 is arranged to fit the shapes of the bracket 104 and the avoidance groove of the middle frame. Therefore, the middle frame 3 is adhered to a first side surface of the sealant layer 105, and the bracket 104 is adhered to a second side surface of the sealant layer 105, so that the bracket 104 is adhered and fixed on the middle frame 3.

In addition, the shape of the second sealant layer 106 between the sound output device 101 and the bracket 104 is arranged to fit the shapes of the bracket 104 and the sound output device 101. Therefore, the sound output device 101 is adhered to the first side surface of the sealant layer 105, and the bracket 104 is adhered to the second side surface of the sealant layer 105, so that the sound output device 101 is adhered and fixed on the bracket 104, and sound emitted by the sound output device 101 is guided to the sound output hole 103 through the first sound cavity 1021.

Further, the shape of the third sealant layer 107 between the step 3021 and the cover 5 is arranged to fit the shape of the step 3021. Therefore, the frame 302 is adhered to the first side surface of the sealant layer 105, the cover 5 is adhered to the second side surface of the sealant layer 105, so that the cover 5 is adhered and fixed on the frame 302.

Because the first sealant layer 105, the second sealant layer 106, and the third sealant layer 107 are arranged in this arrangement manner, the case in which sound guided out from the sound output device 101 is leaked into the terminal device due to unstable connection between the bracket 104 and the middle frame 3, the sound output device 101 and the bracket 104, or the frame 302 and the cover 5 is effectively avoided, and the sound guided out from the sound output device 101 is sealed by the sealant layer 105.

Figure 7:
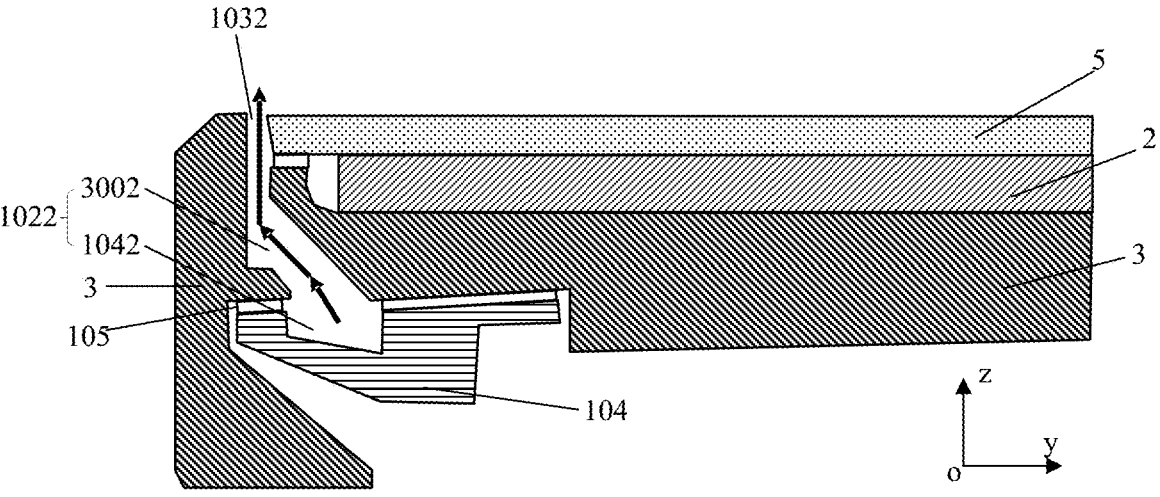
FIG. 7 is a diagram of a yoz cross section in FIG. 3, FIG. 4, and FIG. 5 at a position N.

FIG. 7 is a schematic diagram of a yoz cross section of the sound cavity channel at a position N in FIG. 3, FIG. 4, and FIG. 5. As shown in FIG. 7, the bracket 104 is adhered to the middle frame 3 by the first sealant layer 105. The middle frame 3 and the bracket 104 jointly define a second sound cavity 1022.

As shown in FIG. 7, the second sound output hole set 1032 is opened in the middle frame 3. The second sound cavity 1022 is in communication with the second sound output hole set 1032. Optionally, the second sound output hole set 1032 may be opened in the cover 5.

The middle frame 3 is provided with a second through hole 3002. The bracket 104 is provided with a second groove section 1042. The second through hole 3002 and the second groove section 1042 are opposite to the second sound output hole set 1032. The second through hole 3002 and the second groove section 1042 form the second sound cavity 1022.

Figure 8:
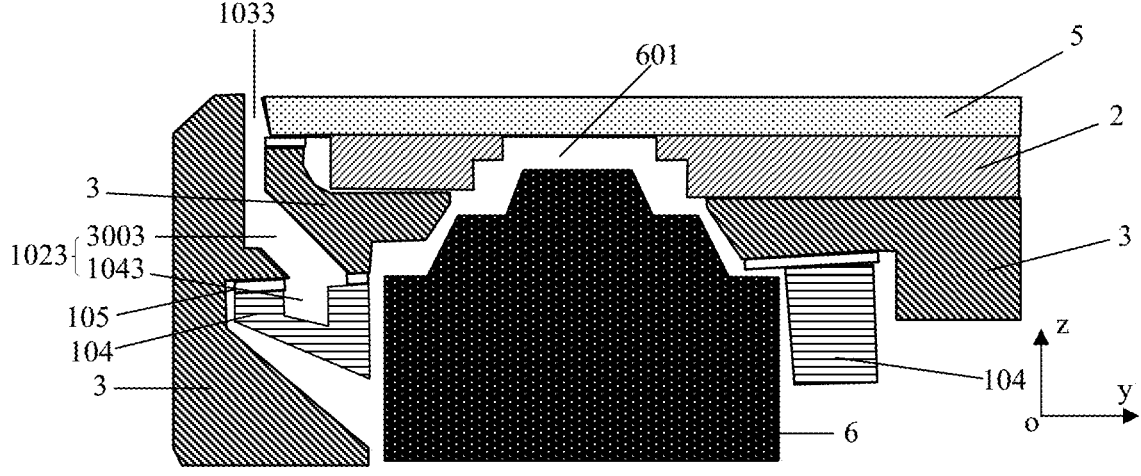
FIG. 8 is a diagram of a yoz cross section in FIG. 3, FIG. 4, and FIG. 5 at a position M.

FIG. 8 is a schematic diagram of a yoz cross section of the sound cavity channel at a position M in FIG. 3, FIG. 4, and FIG. 5. As shown in FIG. 8, the middle frame 3, the bracket 104, and the display module 2 are provided with a groove 601. The front camera module 6 is arranged in the groove 601.

The bracket 104 is adhered to the middle frame 3 by the adhesive layer 105. The middle frame 3 is provided with a through hole 3003. The bracket 104 is provided with a third groove section 1043. The through hole 3003 and the third groove section 1043 jointly form a third sound cavity 1023. The third sound cavity 1023 needs to avoid the front camera module 6, and is located on a side of the front camera module 6 (the third sound cavity 1023 is located on the left side of the front camera module 6 in FIG. 8, and is located at a top of the terminal device in an actual product).

As shown in FIG. 8, the third sound output hole set 1033 is opened in the middle frame 3. The third sound cavity 1023 is in communication with the third sound output hole set 1033. Optionally, the third sound output hole set 1033 is provided in the cover.

In the foregoing implementation, the first groove section 1041, the second groove section 1042, and the third groove section 1043 form the first groove in the bracket 104 in communication.

The first groove section 1041 and the first through hole 3001 are opposite to the first sound output hole set 1031. The sound output device 101 is in communication with the first sound output hole set 1031 through the first groove section 1041 and the first through hole 3001.

The second groove section 1042 and the second through hole 3002 are opposite to the second sound output hole set 1032. The sound output device 101 is in communication with the second sound output hole set 1032 through the first groove section 1041, the second groove section 1042, the third groove section 1043, and the second through hole 3002.

The third groove section 1043 is located between the first groove section 1041 and the second groove section 1042. The third groove section 1043 and the through hole 3003 are opposite to the third sound output hole set 1033. The sound output device 101 is in communication with the third sound output hole set 1033 through the first groove section 1041, the second groove section 1042, and the through hole 3003. The first through hole 1031, the second through hole 1032, and the third through hole 1033 form a through hole in the middle frame 3 in communication. The third through hole 1033 is located between the first through hole 1031 and the second through hole 1032.

The flow direction of sound inside the sound output apparatus is described below with reference to FIG. 6 to FIG. 8:

First, sound emitted from the sound output device 101 enters the first sound cavity 1021.

Subsequently, the first sound cavity 1021 guides sound entering the inside of the first sound cavity 1021 to the third sound cavity 1023 and the first sound output hole set 1031 that are in communication with the first sound cavity 1021.

Subsequently, the third sound cavity 1023 guides the sound guided to the inside of the third sound cavity 1023 to the second sound cavity 1022 and the third sound output hole set 1033 that are in communication with the third sound cavity 1023.

Finally, the second sound cavity 1022 guides the sound guided to the inside of the second sound cavity 1022 to the second sound output hole set 1032.

It can be seen that, through the sound output apparatus shown in this arrangement manner, sound emitted from the sound output device 101 can be guided to the sound output hole 103, so that the user can hear sound emitted from the sound output hole 103 through the sound output hole 103.

In the electronic device provided in the embodiments of this application, the sound output device is in communication with the second sound output hole set through the first groove and the second through hole. Therefore, the sound output device can effectively transmit sound to the second sound output hole set far away from the sound output device through the first groove and the second through hole, to make sound emitted from sound output hole sets at different positions more balanced and avoid inadequate sound output caused by blocking a sound output hole on one side when a user answers a phone call, thereby improving user experience.

Figure 9:
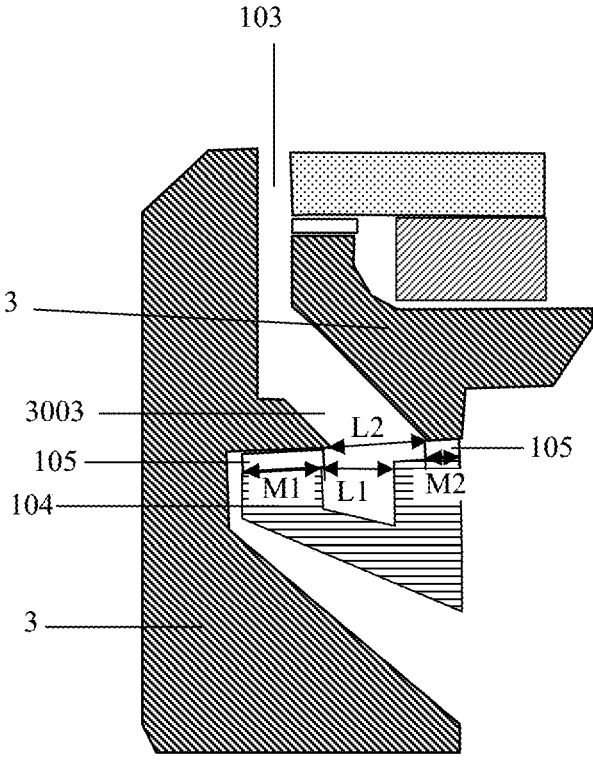
FIG. 9 is a partial enlarged view in FIG. 8.

FIG. 9 is a partial enlarged view of FIG. 8. The middle frame 3 is adhered to the bracket 104 by the sealant layer 105. The third through hole 3003 in the middle frame 3 is in communication with the third groove section 1043 in the bracket 104 to jointly form the third sound cavity 1023.

When being provided at a connection position between the middle frame 3 and the bracket, the sound cavity channel in the middle frame has a width L2. The sound cavity channel provided in the bracket 104 has a width L1. The sealant layer 105 on a left side of the bracket 104 has a width of M1. The sealant layer 105 on a right side has a width of M2.

An inclined pipe of the middle frame 3 is processed by CNC, and there are limitations on the size and angle. In this case, if the communication between the middle frame 3 and the bracket 104 is still maintained to form a sound output pipe, a lateral size of the middle frame 3 includes a lateral projection size L2 corresponding to the size processed by CNC, an adhesive width M1 of an earpiece bracket on a left side of the sound cavity channel, and an adhesive width M2 on a right side. The width L1 of the sound cavity channel in the bracket 104 is less than the width L2 of the sound cavity channel in the middle frame 3. Edges of the bracket 104 and the middle frame 3 are flush.

The embodiments of this application provide another terminal device.

Figure 12:
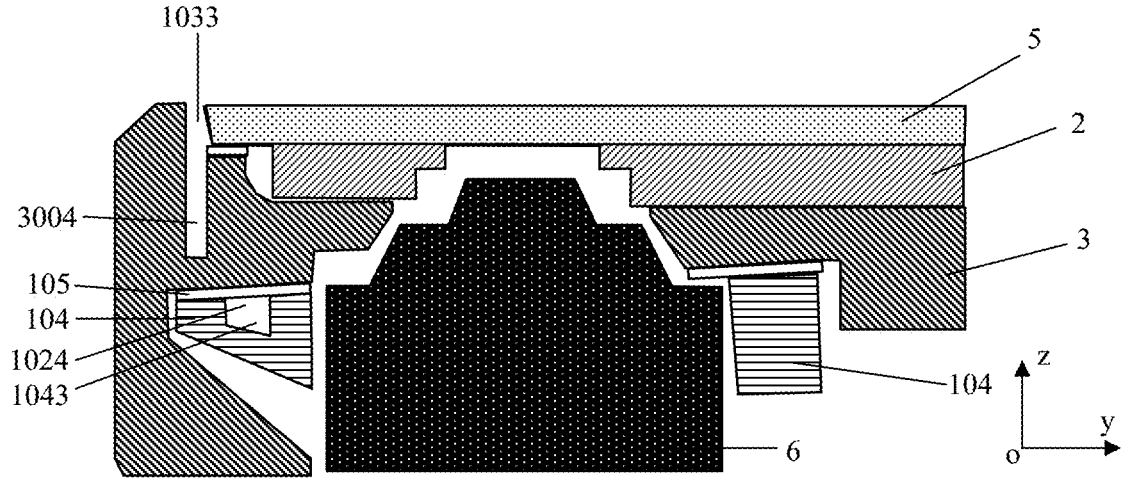
FIG. 12 is a diagram of a yoz cross section of a sound output apparatus according to an embodiment of this application at a position M shown in FIG. 3, FIG. 4, and FIG. 5.

FIG. 12 is a diagram of a yoz cross section of the sound cavity channel at a position M in FIG. 3 and FIG. 4 provided in an embodiment of this application. For a detailed description of the first sound cavity 1021 and the second sound cavity 1022 shown in this arrangement manner, reference is made to the description of the first structure of the sound output apparatus shown above, and details are not described herein again.

Differences from the first structure of the sound cavity channel shown in FIG. 8 lie in that, as shown in FIG. 12, in some embodiments of this application, the through hole 3003 provided in the middle frame 3 is changed to a second groove 3004, and the third groove section 1043 in the bracket 104 is not in communication with the second groove 3004 at a corresponding position of the front camera module (such as a position of a yoz cross section at a point M, i.e., a position of the third sound output hole set 1033).

The opening directions of the second groove 3004 and the first groove both face the z direction.

In some embodiments, the third groove section 1043 and the sealant layer 105 define a channel 1024. The channel 1024 is configured to provide communication between the first sound cavity 1021 and the second sound cavity 1022. In some other embodiments, the channel 1024 may be formed by a through hole substantially in an X direction inside the bracket. That is, instead of forming the channel together with the middle frame 3, the bracket itself forms the channel 1024.

The first sound cavity 1021, the channel 1024, and the second sound cavity 1022 are in communication to form a sound cavity channel. The sound cavity channel can provide communication between the sound output device 101 with the third sound output hole set 1033.

In addition, in some embodiments, the first through hole 3001 is in communication with the second through hole 3002 through the second groove 3004. The second groove 3004 is provided in the middle frame 3.

The second groove 3004 is provided relative to the front camera module 6 in the Y direction. In some embodiments, the second groove 3004 is in communication with the third sound output hole set 1033. The third sound output hole set 1033 corresponds to the second groove 3004 in the Y direction.

It should be noted that, in the Y direction of a corresponding position of the third sound output hole set 1033, the channel 1024 is not in communication with the third sound output hole set 1033. When the second groove 3004 is provided, the second groove 3004 is in communication with the third sound output hole set 1033. The channel 1024 is not in communication with the second groove 3004.

Figure 13:
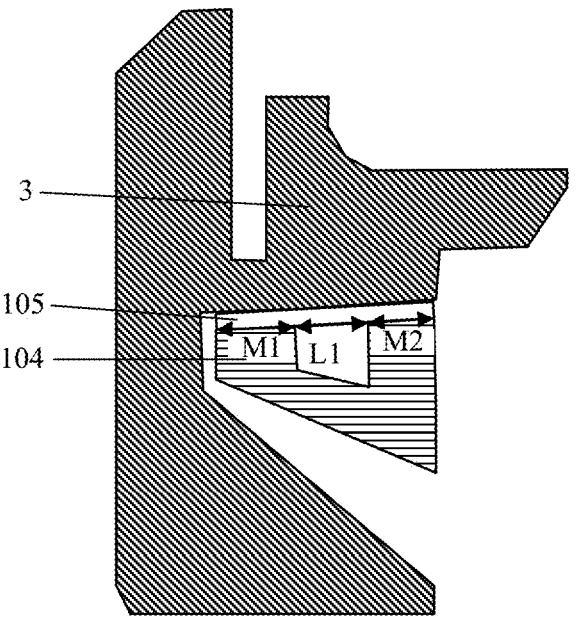
FIG. 13 is a partial enlarged view of the sound output apparatus in FIG. 12.

As shown in FIG. 13, in this embodiment, a shared sound cavity formed by the middle frame 3 and the bracket 104 is canceled herein. Only one channel 1024 (through hole) is formed in the bracket 104. The bracket 104 and a plane of the middle frame 3 are sealed by the sealant layer 105. The lateral size includes a sealing back adhesive width M1 on a left side of the channel 1024+a through hole width L1 formed by injection molding an earpiece bracket+a sealing width M2 on a right side of the channel 1024.

In this embodiment, the channel 1024 does not need to be in communication with the second groove 3004 in the Y direction (it can be understood that, the channel 1024 can be in communication with the second groove 3004 through the first sound cavity 1021 and the second sound cavity 1022, and the channel 1024 is not in communication with the second groove 3004 at a corresponding position in the Y direction, as shown in the diagram of the yoz cross section at a position M). Therefore, there is no need to reserve a size of L2, the lateral size is changed from M1+L2+M2 in FIGS. 9 to M1+L1+M2, and the lateral size decreases. Therefore, the constraints on sizes of the front camera module to edges of the whole mobile phone can be further overcome, so that the front camera module can be closer to an upper border of a display region of the display module, the user experience of the full screen is improved, and the bracket and the middle frame are better sealed.

Figure 10:
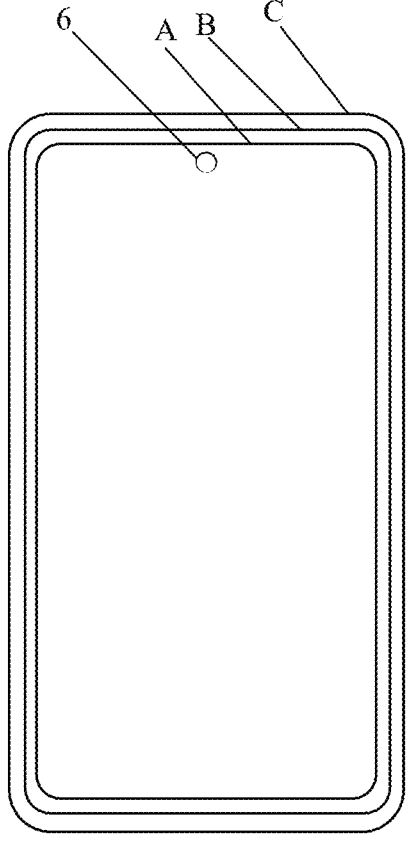
FIG. 10 is a schematic structural diagram of another terminal device.
Figure 11:
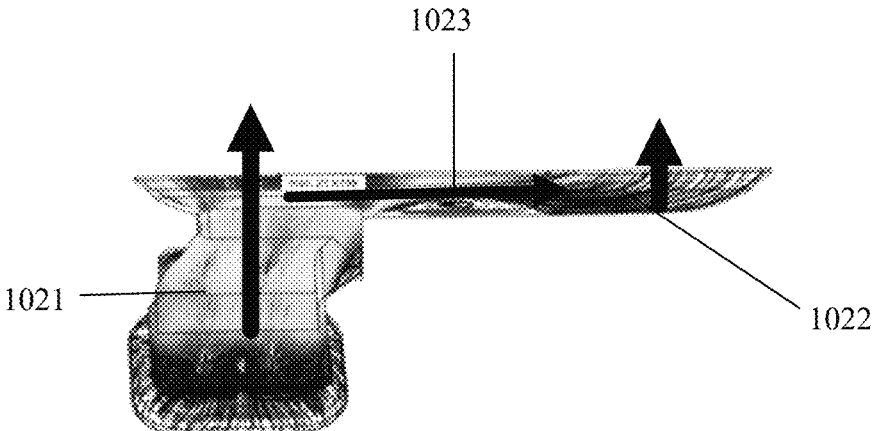
FIG. 11 is a diagram of sound effect simulation of a sound output apparatus.

As shown in FIG. 10, when a distance from the front camera module 6 to the display region boundary A decreases, as shown in FIG. 11, the size of a part of the sound cavity channel 102 between the front camera module 6 and the sound output hole 103 (i.e., the third sound cavity 1023)

is compressed. The transmission of sound emitted from the sound output device 101 encounters a bottleneck. It is difficult for sound emitted from the sound output device 101 to be transmitted from the third sound cavity 1023 to the other side of the camera module (the second sound cavity 1022), resulting in the problem of low voice and varied volume of the user when holding a mobile phone on the left and right hands during a call. The channel 1024 is provided in this embodiment, so that sound can be transmitted to the second sound output hole set 1032 through a sound guide channel, thereby improving the effect of sound emitted from the sound output hole.

In this way, the channel 1024 between the front camera module 6 and the sound output hole 103 (formed by the third groove section 1043 or a channel of the bracket itself) is designed, and two ends of the channel 1024 are respectively in communication with the first sound cavity 1021 and the second sound cavity 1022. Compared with the third sound cavity 1023 in communication with the sound output hole between the front camera module 6 and the sound output hole 103, there is no need to provide the through hole 3003 in communication with the bracket 104 on the middle frame 3 at this position. Therefore, the problem that the connection stability is affected when the front camera module and the edge of the whole device are reduced in size is resolved, so that the front camera module can be closer to an upper border of a display region of the display module, and the user experience of a full screen is improved.

In the electronic device provided in the embodiments of this application, the channel 1024 can bypass a bottleneck position between the camera module and the sound output hole. Therefore, sound emitted from the sound output device can be guided from a position of the sound output device on one side of the camera module to a sound output hole set in the other side of the camera module, thereby improving the effect of sound emitted from the sound output hole. In addition, in the sound output apparatus, there is no need to provide a sound cavity at the bottleneck position between the camera module and the sound output hole, thereby saving the space between the camera module and the sound output hole. Therefore, the camera module can be as close as possible to the display region boundary, and a screen-to-body ratio of the terminal device is effectively improved.

In some embodiments, the middle frame 3 may not be provided with the second groove 3004. That is, the first through hole 3001 is not in communication with the second through hole 3002 through the second groove 3004.

The flow direction of sound of the sound output apparatus in this arrangement manner is described below with reference to FIG. 18:

First, sound emitted from the sound output device 101 enters the first sound cavity 1021.

Subsequently, the first sound cavity 1021 guides the sound entering the inside of the first sound cavity 1021 to the channel 1024 and the first sound output hole set 1031 that are in communication with the first sound cavity 1021. That is, sound emitted from the sound output device 101 can be guided to the first sound output hole set 1031 through the first sound cavity 1021.

The channel 1024 guides the sound entering the inside of the channel 1024 to the second sound cavity 1022 in communication with the channel 1024, and the second sound cavity 1022 guides the sound entering the inside of the second sound cavity 1022 to the second sound output hole set 1032. The first sound cavity 1021, the channel 1024, and the second sound cavity 1022 are in communication.

In some other embodiments of this application, the middle frame 3 is provided with the second groove 3004, and the second groove 104 is in communication with the third sound output hole set 1033.

The first sound cavity 1021 guides the sound entering the inside of the first sound cavity 1021 to the second groove 3004 in communication with the first sound cavity 1021, and the second groove 3004 can guide the sound entering the second groove 3004 to the third sound output hole set 1033.

It can be seen that, sound emitted from the sound output device 101 in this manner can be guided to the first sound output hole set 1031 through the first sound cavity 1021, and can further be guided to the second sound output hole set 1032 through the channel 1024. Optionally, the sound can further be guided to the third sound output hole set 1033 through the second groove 3004.

In the terminal device provided in the embodiments of this application, the sound output apparatus can guide sound emitted from the sound output device in at least two flow directions, so that the sound of the two paths can both be guided to the sound output hole for dispersal. It can be seen that, in this arrangement manner, the efficiency and effect of guiding sound emitted from the sound output device to the sound output hole set can be effectively improved. In addition, the sound guide channel is arranged, so that a communication area between the sound cavity and the sound output hole can be effectively increased, thereby effectively improving the effect of the sound dispersed from the sound output hole.

Figure 14:
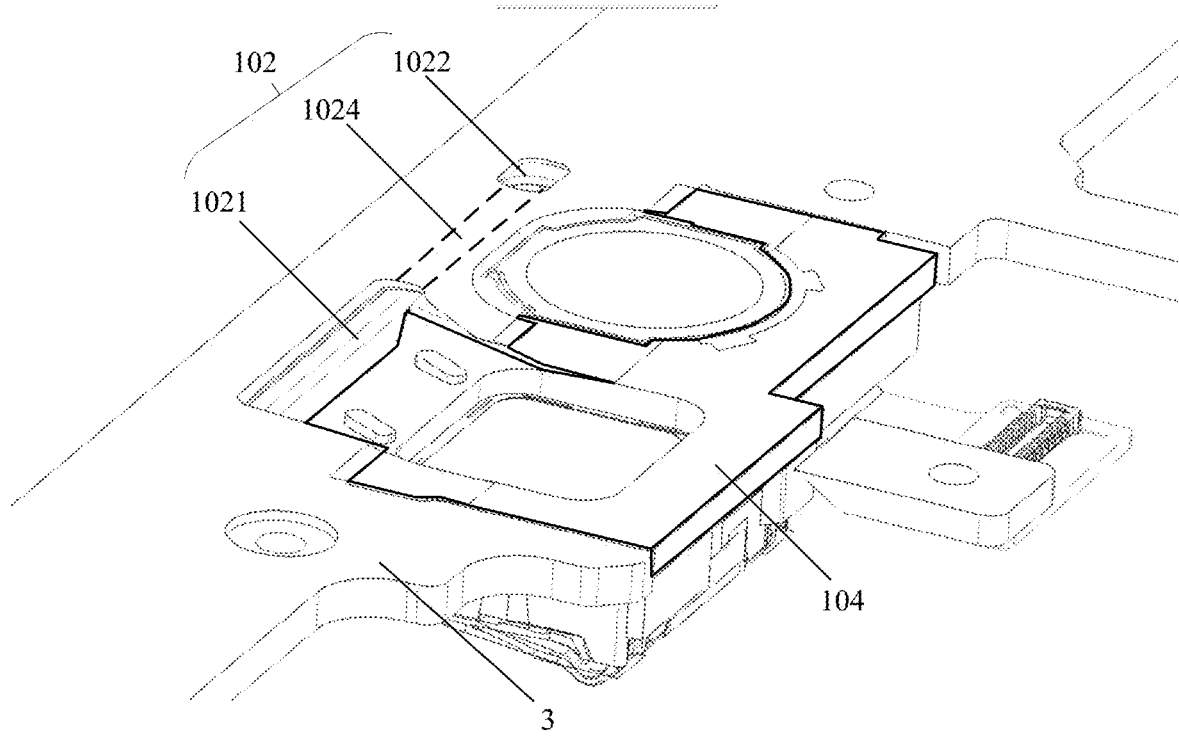
FIG. 14 is a schematic diagram of a front structure of a sound output apparatus according to an embodiment of this application.
Figure 15:
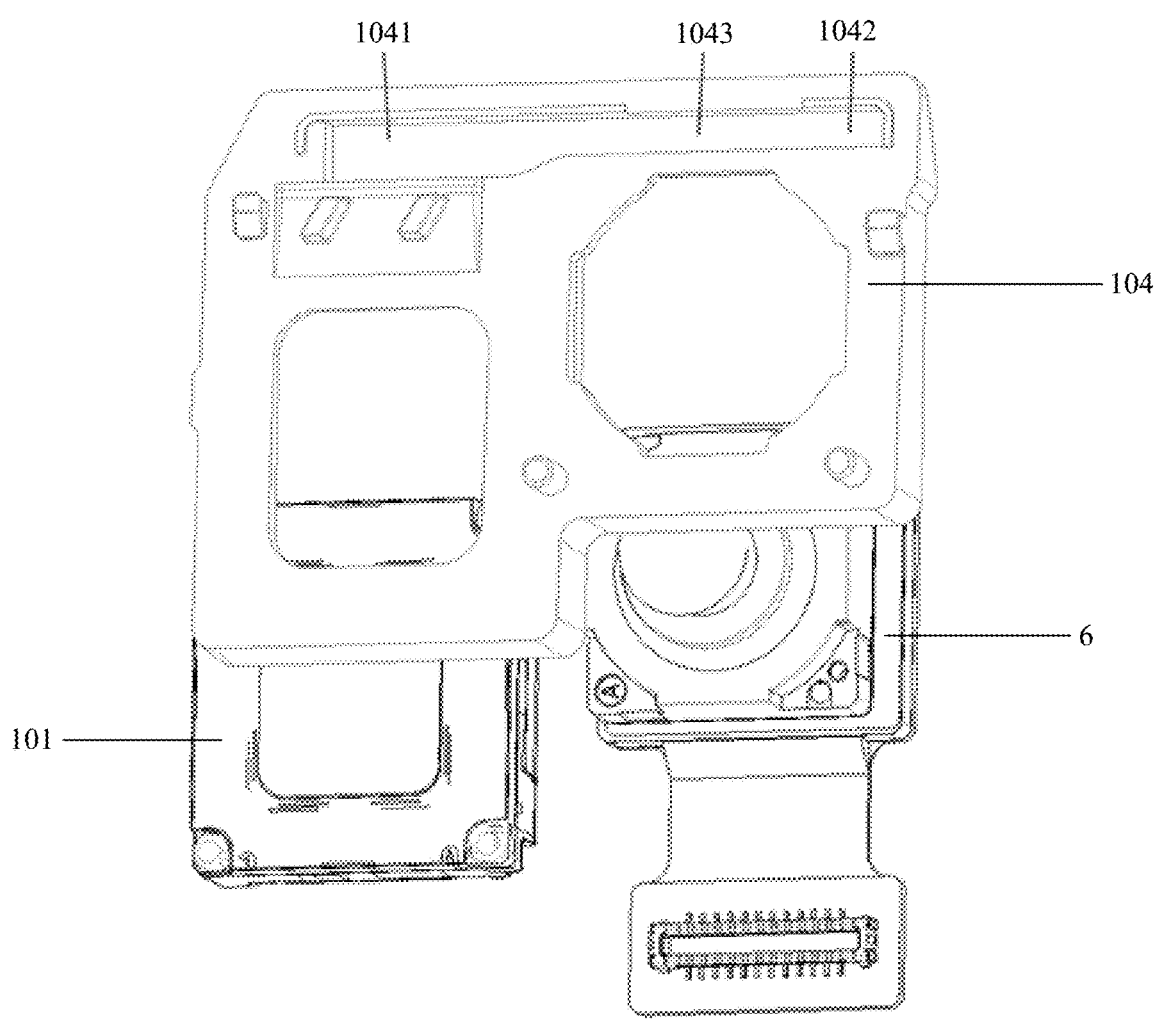
FIG. 15 is a schematic diagram of a front structure of a disassembled sound output apparatus according to an embodiment of this application.
Figure 16:
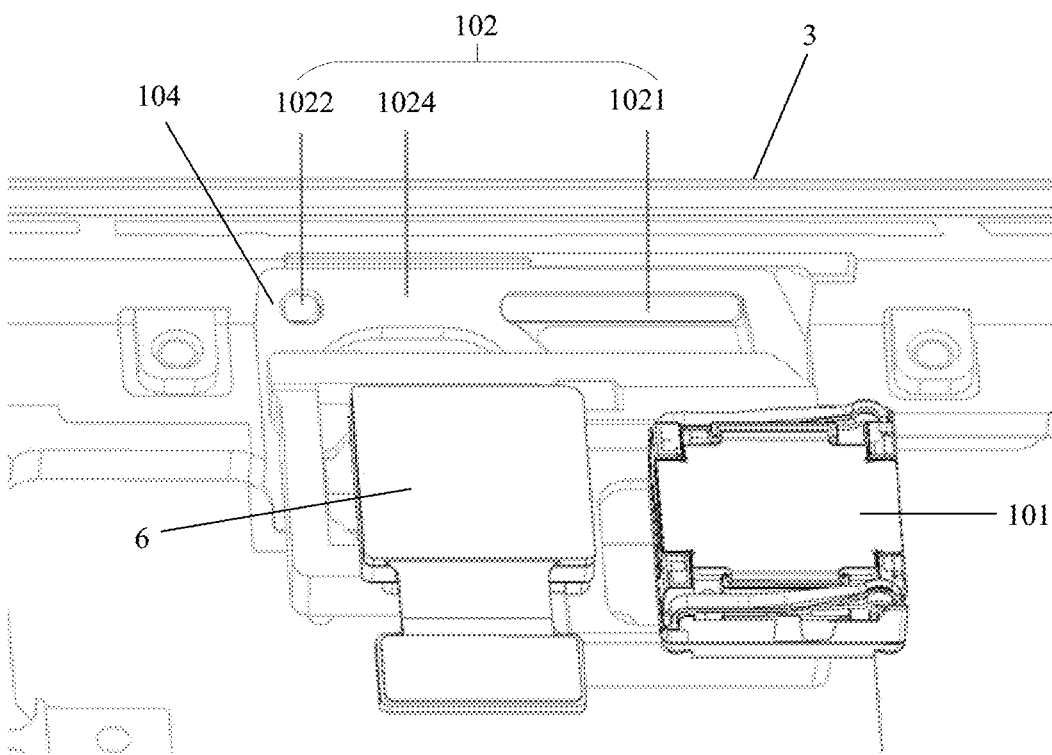
FIG. 16 is a schematic diagram of a back structure of a disassembled sound output apparatus according to an embodiment of this application.
Figure 17:
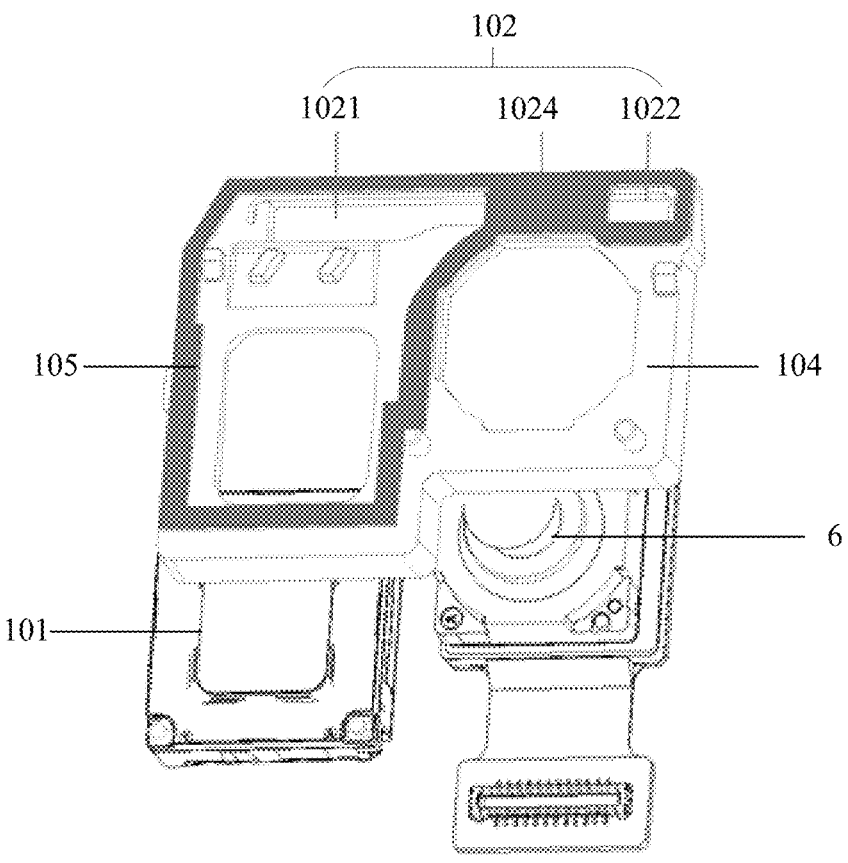
FIG. 17 is a schematic structural diagram of the sound output apparatus shown in FIG. 15 with a sealant layer being arranged.
Figure 18:
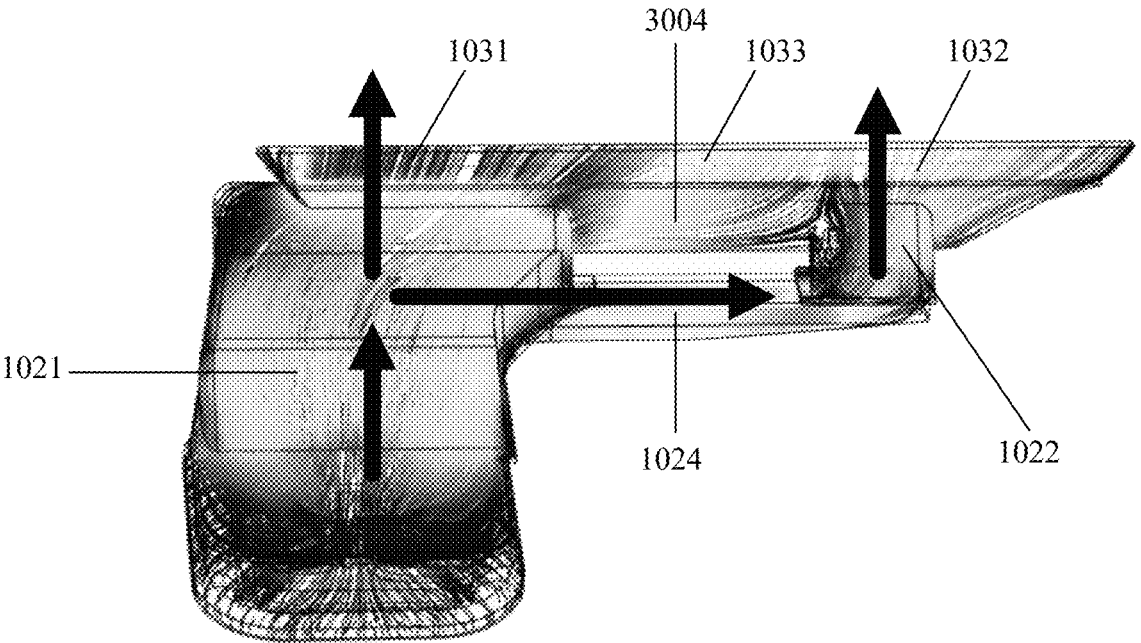
FIG. 18 is a diagram of sound effect simulation of a sound output apparatus according to an embodiment of this application.

The specific structure of the sound cavity shown in FIG. 18 is described below with reference to the accompanying drawings. It should be clarified that, the description of the structure of the sound cavity in this arrangement manner is an optional example, which is not limited, provided that sound emitted from the sound output device can be guided to the sound output hole 103 through the sound cavity:

First, referring to FIG. 14 to FIG. 17, FIG. 14 is a front view of a sound output apparatus. FIG. 15 is a schematic diagram of a front structure of a disassembled sound output apparatus. FIG. 16 is a schematic diagram of a back structure of the inside of a disassembled sound output apparatus. That is, FIG. 14 and FIG. 15 are schematic structural top views of a sound output apparatus with a display module 2 being removed. FIG. 16 is a schematic structural diagram of a disassembled electronic device with the housing 4 being removed. FIG. 17 is a schematic structural view of the sound output apparatus shown in FIG. 15 with a sealant layer being arranged.

As shown in this arrangement manner, the first sound cavity 1021 is formed among the sound output device 101, the bracket 104, and the middle frame 3.

It can be learned with reference to FIG. 14 and FIG. 15 that, the first sound cavity 1021 is provided above in the Y direction and the Z direction of the sound output device 101, and the first sound cavity 1021 and the sound output device 101 are oppositely arranged. The first sound output hole set 1031 is in communication with the first sound cavity 1021 (referring to FIG. 6).

The first sound cavity 1021 shown in this arrangement manner can guide sound emitted from the sound output device 101, to guide the sound emitted from the sound output device 101 to the sound output hole set 1031.

The bracket 104 and the middle frame 3 form the second sound cavity 1022. The second sound cavity 1022 is provided symmetrically on the other side of the front camera (a side away from the sound output device). The second sound output hole set 1032 is in communication with the second sound cavity 1022 (referring to FIG. 7).

It can be learned with reference to FIG. 14 and FIG. 15 that, the first sound cavity 1021 shown in this arrangement manner is in communication with the second sound cavity 1022 through the channel 1024.

There is a groove in the bracket. The groove is divided into three parts, namely, the first groove section 1041, the second groove section 1042, and the third groove section 1043. The first groove section 1041 and the middle frame form the first sound cavity 1021. The second groove section 1042 and the middle frame form the second sound cavity 1022. The third groove section 1043 and the middle frame form the channel 1024.

The first sound cavity 1021 is in communication with the second sound cavity 1022 through the channel 1024. The channel 1024 and the front camera module 6 are located opposite to each other.

The channel 1024 is provided between the camera module and the sound output hole. After guiding sound emitted from the sound output device 101, the first sound cavity 1021 shown in this arrangement manner guides the sound into the second sound cavity 1022 through the channel 1024.

In some embodiments, as shown in FIG. 14 to FIG. 17, the channel 1024 may be formed by connecting the groove provided in the bracket 104 with a surface of the middle frame 3 by the sealant layer 105. In this way, the channel 1024 is provided in the bracket. There is no need to open an inclined hole (as shown in FIG. 9, a part of the through hole 3003) in the middle frame to be in communication with the sound output hole set. The channel has a better sealing effect.

In some other embodiments, the channel 1024 may be a through hole dug in the bracket. The first sound cavity 1021 and the second sound cavity 1022 are connected by the through hole. Instead of forming the channel 1024 together with the middle frame 3, the through hole itself forms the channel 1024.

In this way, sound emitted from the sound output device is guided from the sound output device on one side of the camera module to a sound output hole on the other side of the camera module through the channel 1024, thereby improving the effect of the sound dispersed from the sound output hole. In addition, in the sound output apparatus, the groove 3004 with a relatively small size may be provided or there is no need to provide a through hole 3003 at the bottleneck position of the middle frame between the camera module and the sound output hole, thereby saving the space between the camera module and the sound output hole. Therefore, the camera module can be as close as possible to the display region boundary, and a screen-to-body ratio of the terminal device is effectively improved.

As shown in FIG. 18, in some embodiments, the first through hole 3001 is in communication with the second through hole 3002 through a groove. The groove, that is, the second groove 3004, is provided in the middle frame 3.

The terminal device is provided with the first sound output hole set 1031, the second sound output hole set 1032, and the third sound output hole set 1033. The third sound output hole set 1033 is located between the first sound output hole set 1031 and the second sound output hole set 1032. The second groove 3004 is in communication with the third sound output hole set 1033.

It should be noted that, the channel 1024 is not in communication with the third sound output hole set 1033. When the second groove 3004 is provided, the second groove 3004 is in communication with the third sound output hole set 1033. The channel 1024 is not in communication with the second groove 3004.

The first sound cavity 1021 is in communication with the second sound cavity 1022 through the channel 1024. Sound emitted from the sound output device can be effectively guided into the second sound cavity 1022 through the channel 1024, and dispersed from the second sound output hole set 1032.

The first sound cavity 1021 is further in communication with the third sound output hole set 1033 through the second groove 3004. Sound emitted from the sound output device can be guided to the second groove 3004 through the first sound cavity 1021, and dispersed from the third sound output hole set 1033.

In the sound output apparatus provided in the embodiments of this application, the channel 1024 is provided, so that the bottleneck position between the camera module and the sound output hole can be bypassed. Therefore, the sound emitted from the sound output device can be guided from the position of the sound output device on one side of the camera module to the second sound cavity 1022 on the other side of the camera module, thereby improving the sound effect. A plurality of channels inside the sound output apparatus can guide sound emitted from the sound output device to the sound output hole located in the terminal device within a limited space inside the sound output apparatus, so as to effectively improve the effect of the sound guide of the sound output device, and ensure the effect of sound emitted from the sound output hole.

In addition, in the sound output apparatus, there is no need to provide a through hole 3003 at the bottleneck position of the middle frame between the camera module and the sound output hole, thereby saving the space between the camera module and the sound output hole. Therefore, the camera module can be as close as possible to the display region boundary, and a screen-to-body ratio of the terminal device is effectively improved.

It should be noted that, the sound output apparatus may be arranged in other positions of the terminal device, so that the front camera module can be avoided, and a motor, a rear camera, and the like can be avoided. Details are not described herein again, which all fall within the protection scope of this application.

The foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A terminal device, comprising:
   a middle frame with a first through hole and a second through hole;
   a display module mounted on the middle frame;
   a sound output device located on a side of the middle frame away from the display module;
   a first sound output hole set; and
   a second sound output hole set; wherein
   the first sound output hole set and the second sound output hole set are provided between a top of the terminal device and the sound output device;
   wherein the sound output device and the first sound output hole set are located on a first side of a center of the top of the terminal device, and the sound output device is opposite to the first sound output hole set; wherein the second sound output hole set is located on a second side of the center of the top of the terminal device;

wherein the sound output device is fixed to the middle frame by a bracket;

wherein the bracket is provided with a first groove close to the middle frame, and wherein the first groove comprises a first groove section, a second groove section, and a third groove section located between the first groove section and the second groove section;

wherein the first groove section and the first through hole are opposite to the first sound output hole set, and the second groove section and the second through hole are opposite to the second sound output hole set;

wherein the sound output device is in communication with the first sound output hole set through the first groove section and the first through hole, and the sound output device is in communication with the second sound output hole set through the first groove section, the second groove section, the third groove section, and the second through hole; and wherein a channel is formed in the third groove section or in the bracket and the channel is configured to allow sound transmission to bypass a bottleneck caused by a camera module and to improve a screen-to-body ratio of the terminal device.

2. The terminal device according to claim 1, wherein the first through hole, in the middle frame, is not in communication with the second through hole.

3. The terminal device according to claim 1, wherein the terminal device further comprises a front camera module located at a middle position of a top of a screen; wherein the first groove is located between the front camera module and the top of the terminal device, the first through hole and the second through hole are located between the front camera module and the top of the terminal device, and the third groove section is opposite to the front camera module.

4. The terminal device according to claim 3, wherein the first through hole, in the middle frame, is not in communication with the second through hole.

5. The terminal device according to claim 3, wherein the middle frame is provided with a second groove communicating with the first through hole and the second through hole, wherein the second groove is opposite to the front camera module.

6. The terminal device according to claim 5, wherein the middle frame is provided with a third through hole communicating with the second groove and the third groove section.

7. The terminal device according to claim 6, wherein the terminal device further comprises a third sound output hole set opposite to the second groove;

wherein the third sound output hole set is located between the first sound output hole set and the second sound output hole set, and the third sound output hole set is in communication with the second groove.

8. The terminal device according to claim 7, wherein the first sound output hole set, the second sound output hole set, and the third sound output hole set form one sound output hole.

9. The terminal device according to claim 7, wherein the first sound output hole set, the second sound output hole set, and the third sound output hole set are provided in the middle frame.

10. The terminal device according to claim 5, wherein the second groove is not in communication with the third groove section in a vertical direction.

11. The terminal device according to claim 10, wherein the terminal device further comprises a third sound output hole set opposite to the second groove;

wherein the third sound output hole set is located between the first sound output hole set and the second sound output hole set, and the third sound output hole set is in communication with the second groove.

12. The terminal device according to claim 5, wherein the terminal device further comprises a third sound output hole set opposite to the second groove;

wherein the third sound output hole set is located between the first sound output hole set and the second sound output hole set, and the third sound output hole set is in communication with the second groove.

13. The terminal device according to claim 12, wherein each of the first sound output hole set, the second sound output hole set, and the third sound output hole set comprises one or more sound output holes.

14. The terminal device according to claim 13, wherein shape of the sound output hole is round or square.

15. The terminal device according to claim 13, wherein the first sound output hole set, the second sound output hole set, and the third sound output hole set are provided in the middle frame.

16. The terminal device according to claim 13, wherein a cover is arranged on a surface of the display module away from the middle frame, and the first sound output hole set, the second sound output hole set, and the third sound output hole set are provided in the cover.

17. The terminal device according to claim 12, wherein the first sound output hole set, the second sound output hole set, and the third sound output hole set form one sound output hole.

18. The terminal device according to claim 12, wherein the first sound output hole set, the second sound output hole set, and the third sound output hole set are provided in the middle frame.

19. The terminal device according to claim 12, wherein a cover is arranged on a surface of the display module away from the middle frame, and the first sound output hole set, the second sound output hole set, and the third sound output hole set are provided in the cover.

20. A terminal device, comprising:

a middle frame with a first through hole and a second through hole;

a sound output device fixed to a side of the middle frame by a bracket;

a first sound output hole set; and a second sound output hole set; wherein the sound output device and the first sound output hole set are located on a first side of a center of the top of the terminal device, and the sound output device is opposite to the first sound output hole set; wherein the second sound output hole set is located on a second side of the center of the top of the terminal device;

wherein the bracket is provided with a first groove close to the middle frame, and wherein the first groove comprises a first groove section, a second groove section, and a third groove section located between the first groove section and the second groove section;

wherein the first groove section and the first through hole are opposite to the first sound output hole set, and the second groove section and the second through hole are opposite to the second sound output hole set;

wherein the sound output device is in communication with the first sound output hole set through the first groove section and the first through hole, and the sound output device is in communication with the second sound output hole set through the first groove section, the second groove section, the third groove section, and the second through hole; and wherein a channel is formed in the third groove section or in the bracket and the channel is configured to allow sound transmission to bypass a bottleneck caused by a camera module and to improve a screen-to-body ratio of the terminal device.

* * * * *